(12) United States Patent
Choi et al.

(10) Patent No.: US 12,415,678 B2
(45) Date of Patent: Sep. 16, 2025

(54) CHEMICAL SUPPLY SYSTEM

(71) Applicant: Samsung Electronics Co., Ltd., Suwon-si (KR)

(72) Inventors: Hyungho Choi, Suwon-si (KR); Dongwon Kim, Suwon-si (KR); Minyoung Kim, Hwaseong-si (KR); Jongkyu Kim, Suwon-si (KR); Jinho So, Seoul (KR); Jaehwa Yang, Hwaseong-si (KR); Soonwook Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 397 days.

(21) Appl. No.: 17/984,373

(22) Filed: Nov. 10, 2022

(65) Prior Publication Data

US 2023/0278796 A1    Sep. 7, 2023

(30) Foreign Application Priority Data

Mar. 3, 2022    (KR) .................. 10-2022-0027536
Apr. 18, 2022   (KR) .................. 10-2022-0047356

(51) Int. Cl.
*B65G 1/137*    (2006.01)
*B25J 5/00*     (2006.01)
(Continued)

(52) U.S. Cl.
CPC ............ *B65G 1/1373* (2013.01); *B25J 5/007* (2013.01); *B25J 11/005* (2013.01); *B25J 13/08* (2013.01); *B65G 1/0485* (2013.01); *B65G 1/0492* (2013.01); *B65G 47/24* (2013.01); *B65G 2201/0223* (2013.01);
(Continued)

(58) Field of Classification Search
CPC ........ B25J 9/0084; B25J 11/005; B25J 13/08; B25J 5/007; B65G 1/0485; B65G 1/0492; B65G 2201/0223; B65G 2201/0267; B65G 2201/0235; B65G 2203/0233; B65G 47/24
See application file for complete search history.

(56) References Cited

U.S. PATENT DOCUMENTS

2017/0113352 A1*   4/2017   Lutz ................. B25J 9/1682
2021/0101790 A1*   4/2021   Kilibarda ............ B65G 1/0407
(Continued)

FOREIGN PATENT DOCUMENTS

CN    214870622 U    11/2021
JP    4304588 B2     7/2009
(Continued)

*Primary Examiner* — Glenn F Myers
(74) *Attorney, Agent, or Firm* — Muir Patent Law, PLLC

(57) ABSTRACT

A chemical supply system, includes: a chemical container receiving station configured to receive a chemical container, inspect chemical information of the chemical container and confirm the chemical information; a temporary storage configured to store the chemical container; a chemical supply device configured to supply a chemical in the chemical container to a place of use of the chemical; a first robot configured to transport the chemical container for which the chemical information is confirmed from the chemical container receiving station; and a second robot configured to carry the chemical container transported by the first robot into the chemical supply device.

18 Claims, 12 Drawing Sheets

(51) Int. Cl.
  *B25J 11/00* (2006.01)
  *B25J 13/08* (2006.01)
  *B65G 1/04* (2006.01)
  *B65G 47/24* (2006.01)

(52) U.S. Cl.
  CPC ............ *B65G 2201/0235* (2013.01); *B65G 2201/0267* (2013.01); *B65G 2203/0208* (2013.01)

(56) References Cited

U.S. PATENT DOCUMENTS

2021/0316975 A1* 10/2021 Yeo .................. G01S 17/42
2022/0274780 A1*  9/2022 Byeon ............... B25J 15/0033

FOREIGN PATENT DOCUMENTS

| | | |
|---|---|---|
| JP | 2021062964 A | 4/2021 |
| KR | 1020150105930 A | 9/2015 |
| KR | 1020160021372 A | 2/2016 |
| KR | 101642640 B1 | 7/2016 |
| KR | 1020170017956 A | 2/2017 |
| KR | 1020170017957 A | 2/2017 |
| KR | 1020170017958 A | 2/2017 |
| KR | 101947450 B1 | 2/2019 |
| KR | 101973503 B1 | 4/2019 |
| KR | 101984508 B1 | 5/2019 |
| KR | 102067753 B1 | 2/2020 |
| KR | 102092609 B1 | 3/2020 |
| KR | 102119268 B1 | 6/2020 |
| KR | 102169248 B1 | 10/2020 |
| KR | 102220925 B1 | 2/2021 |
| KR | 102277045 B1 | 7/2021 |
| KR | 102287974 B1 | 8/2021 |
| KR | 102295510 B1 | 8/2021 |
| KR | 102311339 B1 | 10/2021 |
| KR | 102326021 B1 | 11/2021 |
| KR | 102343482 B1 | 12/2021 |
| KR | 102345669 B1 | 12/2021 |

* cited by examiner

CHEMICAL SUPPLY SYSTEM

CROSS-REFERENCE TO RELATED APPLICATION

This application claims priority to Korean Patent Application No. 10-2022-0027536, filed on Mar. 3, 2022, with the Korean Intellectual Property Office, and 10-2022-0047356, filed on Apr. 18, 2022, with the Korean Intellectual Property Office, the entire disclosures of which are incorporated herein by reference.

BACKGROUND

1. Field

The present disclosure relates to a chemical supply system.

2. Description of Related Art

Various types of chemicals used in a semiconductor process are respectively supplied to appropriate locations (or process operations) by a chemical supply device. The chemicals are supplied in a chemical container, and therefore, an operation of carrying in a chemical container into the chemical supply device or carrying out a chemical container from which chemicals are exhausted from the chemical supply device is performed. In the carrying-in and carrying-out operations of a chemical container, it is important to develop a chemical supply system that can prevent safety accidents and improve operational efficiency.

SUMMARY

An aspect of the present inventive concept is to provide a chemical supply system having improved operational efficiency.

According to an aspect of the present inventive concept, a chemical supply system, includes: a chemical container receiving station configured to receive a chemical container, inspect chemical information of the chemical container and confirm the chemical information; a temporary storage configured to store the chemical container; a chemical supply device configured to supply a chemical in the chemical container to a place of use of the chemical; a first robot configured to transport the chemical container for which the chemical information is confirmed from the chemical container receiving station; and a second robot configured to carry the chemical container transported by the first robot into the chemical supply device.

According to an aspect of the present inventive concept, a chemical supply system, includes: a chemical supply device having a chemical container accommodating space in which a chemical container is accommodated, and configured to supply a chemical in the chemical container to a place of use of the chemical; and a mobile robot configured to fasten and separate a coupling interface to an outlet of the chemical container carried into the chemical accommodating space.

According to an aspect of the present inventive concept, a chemical supply system, includes: a chemical container receiving station configured to inspect chemical information of a chemical container and confirm the chemical information; a temporary storage configured to store the chemical container; a chemical supply device configured to supply a chemical in the chemical container to a place of use of the chemical; first and second robots configured to transfer the chemical container for which the chemical information is confirmed to the temporary storage, or the chemical supply device, wherein the first robot is configured to transfer the chemical container from the chemical container receiving station to the temporary storage or transfer the chemical container to the second robot, and the second robot is configured to transfer the chemical container received from the first robot to the chemical supply device.

BRIEF DESCRIPTION OF DRAWINGS

The above and other aspects, features, and advantages of the present inventive concept will be more clearly understood from the following detailed description taken in conjunction with the accompanying drawings, in which.

DETAILED DESCRIPTION

Hereinafter, example embodiments of the present inventive concept will be described with reference to the accompanying drawings as follows.

Figure 1:
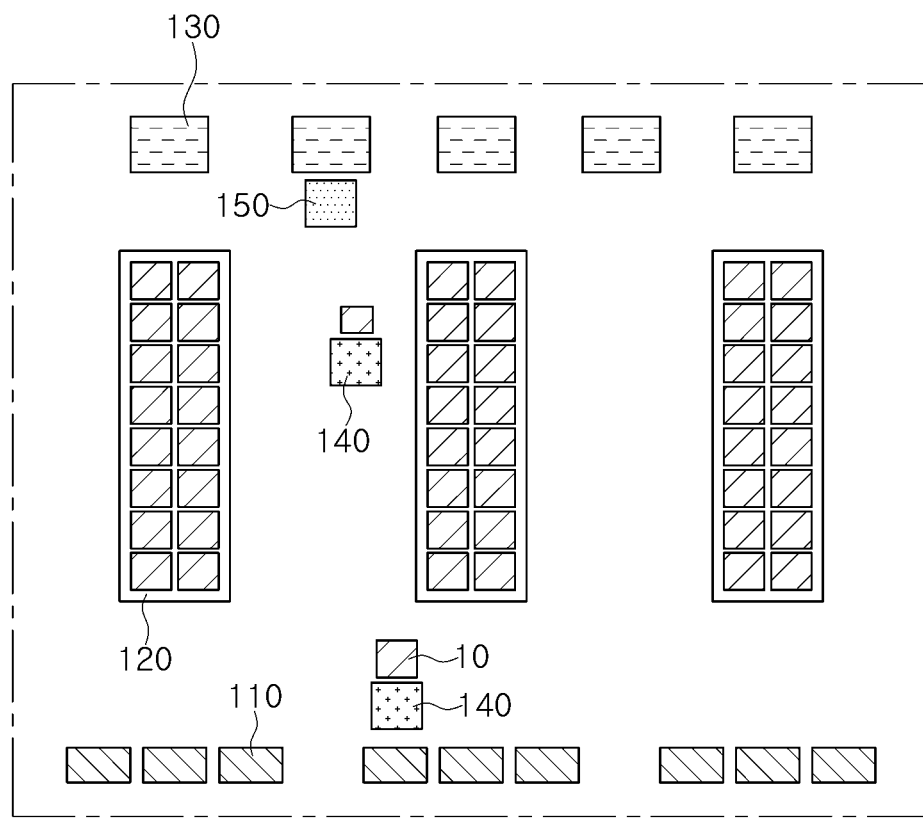
FIG. 1 is a diagram illustrating a chemical supply system according to an example embodiment of the present inventive concept.

FIG. 1 is a diagram illustrating a chemical supply system 100 according to an example embodiment of the present inventive concept.

Referring to FIG. 1, the chemical supply system 100 of an example embodiment may include a chemical carrying-in device 110, a temporary storage 120, a chemical supply device 130, a first robot 140, and a second robot 150. In chemical supply system 100 according to the present inventive concept, by putting a chemical container bundle 10 carried into the chemical carrying-in device 110 in the chemical supply device 130 using the first robot 140 and the second robot 150, or storing the same in the temporary storage 120, it is possible to prevent a safety accident occurring in a process of carrying in and carrying out a heavy chemical container, and to improve efficiency of a transfer operation of the chemical container. It should be noted that certain items are described in the singular, but are provided in plural, as can be seen from the various figures. Also, ordinal numbers such as "first," "second," "third," etc. may be used simply as labels of certain elements, steps, etc., to distinguish such elements, steps, etc. from one another.

Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

The chemical carrying-in device 110 may be configured to inspect chemical information included in the chemical container bundle 10. The chemical information may include information for determining whether a chemical in the chemical container is a chemical used by the chemical supply device 130 or a place of use thereof, and may include, for example, material information, an expiration date, and the like. The chemical information may be inspected by scanning a code, such as a barcode or a QR code attached to a surface of the chemical container. For example, when the chemical information of the chemical container states that the chemical thereof is unsuitable for use in the chemical supply device 130, the chemical container may be returned externally.

The temporary storage 120 may be configured to store a chemical container. The temporary storage may temporarily store a chemical bundle 10 before being carried into the chemical supply device 130 and/or a chemical bundle 10 being carried out from the chemical supply device 130 after all the chemicals thereof are exhausted. The temporary storage 120 may be disposed between the chemical carrying-in device 110 and the chemical supply device 130 in consideration of movement of the first robot 140 and the second robot 150. For example, the chemical carrying-in device 110 may be disposed on one side (e.g., a first side) of the temporary storage 130, and the chemical supply device 130 may be disposed on the other side (e.g., a second side) of the temporary storage 120.

The chemical supply device 130 may be configured to supply the chemical in the chemical container included in the chemical container bundle 10 to a place of use thereof. The chemical supply device 130 may connect a coupler to an outlet of the chemical container, so that the chemical in the chemical container is supplied to the place of use thereof along a chemical supply pipe. For example, a pump for chemical transfer, or the like may be installed in the chemical supply device 130. The chemical supply device 130 may be described as a chemical supplying device, or a chemical supplying station.

The first robot 140 and the second robot 150 may be configured, programmed, and controlled to transfer a chemical container bundle 10 or a chemical container for which the chemical information is confirmed to the temporary storage 120 or the chemical supply device 130. The first robot 140 may be configured, programmed, and controlled to carry out the chemical container bundle 10 or the chemical container from the chemical carrying-in device 110. The second robot 150 may be configured, programmed, and controlled to carry in the chemical container bundle 10 or the chemical container carried out by the first robot into the chemical supply device 130. For example, the first robot 140 may transfer the chemical container bundle 10 or the chemical container from the chemical carrying-in device 110 to the temporary storage 120 or transfer the same to the second robot 150, and the second robot 150 may transfer the chemical container bundle 10 or the chemical container received from the first robot 140 to the chemical supply device 130. The first robot 140 and the second robot 150 may perform an operation according to a transfer command or replacement command of the chemical container transmitted by a control system. The first robot 140 and the second robot 150 may access the chemical carrying-in device 110, the temporary storage 120, or the chemical supply device 130 designated by the control system, and may perform a transfer operation of the chemical container bundle 10. The first robot 140 and the second robot 150 may perform a transfer operation of the chemical container bundle 10 according to location information and/or path information input in advance. As described above, the first robot 140 and the second robot 150 interact to transfer the chemical container bundle 10 or chemical container, thereby preventing safety accidents and improving the efficiency of the transfer operation of the chemical container. The first robot 140 may be a first type of robot having a first structure and configuration, and the second robot 150 may be a second type of robot different form the first robot in structure and/or configuration.

Hereinafter, each component that may be applied to the chemical supply system 100 according to example embodiments of the present inventive concept will be described in detail.

Figure 2A:
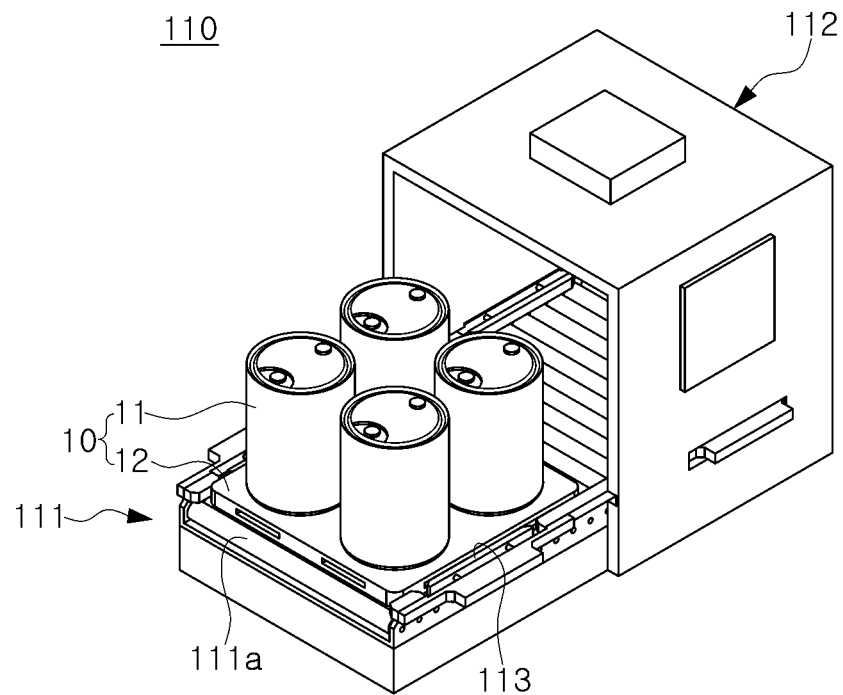
FIGS. 2A and 2B are diagrams exemplarily illustrating a chemical carrying-in device applicable to a chemical supply system according to an example embodiment.
Figure 2B:
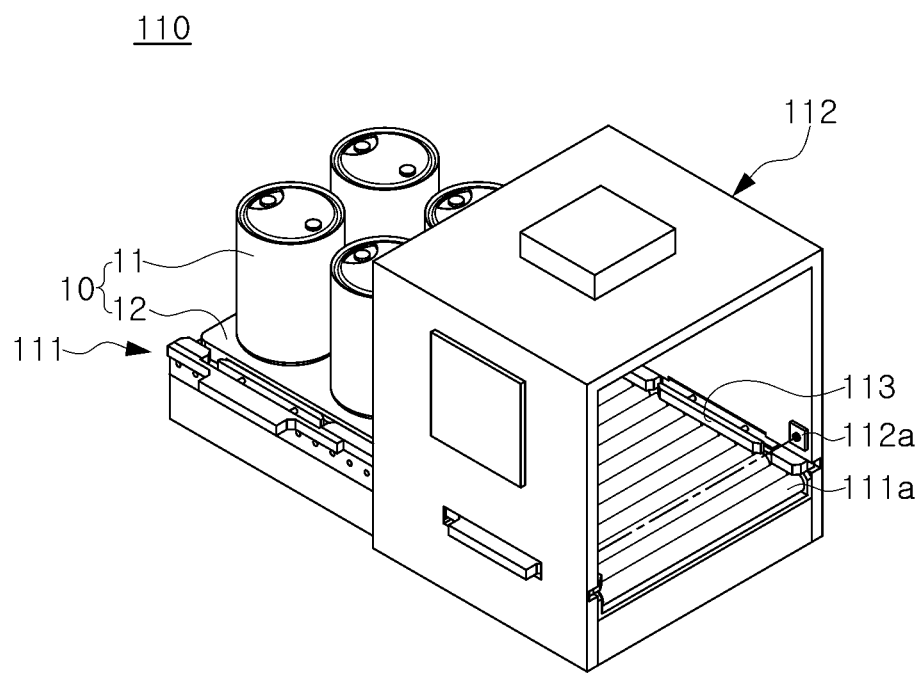

FIGS. 2A and 2B are diagrams exemplarily illustrating a chemical carrying-in device 110 applicable to a chemical supply system according to an example embodiment.

Referring to FIGS. 2A and 2B, the chemical carrying-in device 110 of an example embodiment may include a transfer member 111 and an inspection member 112. The chemical carrying-in device 110 is a location in which the chemical container 11 or the chemical container bundle 10 containing the chemical is received, and may be described as a chemical carrying-in station or a chemical container receiving station. The chemical container bundle 10 may be put into the chemical carrying-in device 110 by a forklift or an unmanned forklift. The chemical container bundle 10 may include a plurality of chemical containers 11, for example drums, loaded on the pallet 12. Hereinafter, the term "chemical container 11" may be used to describe a single, individual chemical container (e.g., drum), a plurality of chemical containers, or a chemical container bundle 10 loaded on a pallet 12. The chemical carrying-in device 110 (e.g., the transfer member 111 of the chemical carrying-in device 110) may transfer the chemical container 11 received from the outside to the inspection member 112, and chemical information of the chemical container 11, for example, material information, an expiration date, and the like may be inspected with the inspection member 112. The chemical container 11 for which the chemical information is confirmed may be carried out (e.g., removed and transported) from the chemical carrying-in device 110 by the first robot 140 (refer to FIG. 3A).

The transfer member 111 may have one side (e.g., a first side) on which the chemical container 11 is seated and the other side (e.g., a second side) on which the chemical container 11 is transferred to inspect chemical information. The transfer member 111 may be configured to transfer the chemical container bundle 10 loaded on one side in one direction. For example, when the pallet 12 on which the chemical container 11 is loaded is seated on the one side of the transfer member 111, the transfer member 111 may be operated so that the pallet 12 is transferred to the other side, and when the pallet 12 is seated on the other side of the transfer member 111, the transfer member 111 may be stopped.

The transfer member 111 may be a transfer platform configured to transport a chemical container 111 from one location to a second location. For example, in one embodiment, the transfer member 111 may be a conveyor device, composed of rollers or belts 111a. For example, the transfer member 111 may transport the chemical container 11 from the one side to the other side or an opposite direction thereof by rotating a plurality of rollers disposed in one direction to move a belt on which the chemical container 11 is mounted. However, other transport mechanisms may be used, such as hydraulic or actuator controlled movable arms or frames.

According to an example embodiment, a first sensor (not illustrated) for detecting whether the chemical container 11 or the pallet 12 is seated on the transfer member 111 may be disposed. As an example, in order to check whether the chemical container 11 is seated and a position of the transfer member 111, the first sensor may be installed at regular intervals on a side surface of the transfer member 111 or on a fall prevention guide. The first sensor may be, for example, a load detection sensor for detecting the presence or absence of the chemical container 11 on the transfer member 111 by detecting an amount of load (e.g., weight) disposed on the transfer member 111). However, other sensors may be used, such as image sensors, for example. In addition, the transfer member 111 may be made of a corrosion-resistant coating, which is strongly resistant to corrosion, and a corrosion-resistant material such as PTFE, or the like, and according to an example embodiment, a leakage detection sensor may be installed on the transfer member 111 to detect chemical leakage of the chemical container 11. For example, a leakage detection sensor may sense the presence of liquid.

Meanwhile, the chemical carrying-in device 110 may further include an alignment member 113 configured to align the chemical container bundle 10 on the transfer member 111. The alignment member 113 may be disposed on both sides (e.g., opposite sides) of the transfer member 111 and in a direction of movement of the pallet 12, to align the chemical container 11 or the pallet 12 to a central portion of the transfer member 111. For example, the alignment member 113 may align the chemical container 11 to the central portion of the transfer member 111 before the transfer member 111 operates. In addition, a guide for preventing separation of the chemical container 11 or the chemical container bundle 10 may be installed on both sides of the transfer member 111 while the transfer member 111 operates.

Depending on a transfer distance of the chemical container 11 by the transfer member 111, only one of the fall prevention guide or the alignment member 113 may be installed. For example, when the transport distance of the chemical container 11 is in a range of about 3000 mm to about 4000 mm, the chemical container 11 may be stably transferred by the guide, without the alignment member 113.

The inspection member 112 may be configured to inspect chemical information of the chemical container 11 from the other side of the transfer member 111. The transfer member 111 may stop the operation when the chemical container 11 arrives at a correct position for chemical inspection. A sensor for confirming the position of the chemical container 11 may be installed on the transfer member 111 or the inspection member 112. For example, the chemical carrying-in device 110 may include a second sensor 112a for detecting whether the chemical container 11 or the pallet 12 protrudes from the other side of the transfer member 111. The second sensor may be a fork sensor for detecting whether the chemical container 11 protrudes so that the chemical container 11 does not deviate from a position of the chemical inspection.

The inspection member 112 may include an inspection sensor for inspecting chemical information of the chemical container 11. For example, the inspection sensor may scan a QR code or barcode information attached to an upper portion or a side surface of the chemical container 11 to check material information, an expiration date, and the like, of the chemical container, and transmit the same to a control system. In addition, when the chemical information transmitted to the control system does not meet required specifications, the chemical container 11 may be returned externally by the transfer member 111. The inspection member may include a housing or a frame structure through which the chemical container 11 is positioned, and which supports the inspection sensor. The inspection member may be described as an inspection compartment or an inspection area.

An alignment member 113 may be installed on both sides of the transfer member 111 passing through the inspection member 112. The alignment member 113 may align the chemical container 11 to a position for inspecting chemical information and carrying in and carrying out the chemical container 11 of the first robot ('140' in FIG. 3A). The alignment member 113 may include alignment bars or alignment arms that contact the pallet 12, for example, and may be described as an alignment track.

The chemical container 11 for which the chemical information is confirmed may be carried out from the chemical carrying-in device 110 by the first robot 140. The chemical carrying-in device 110 may include an air spraying module for removing foreign substances before the chemical container 11 is carried out.

Figure 3A:
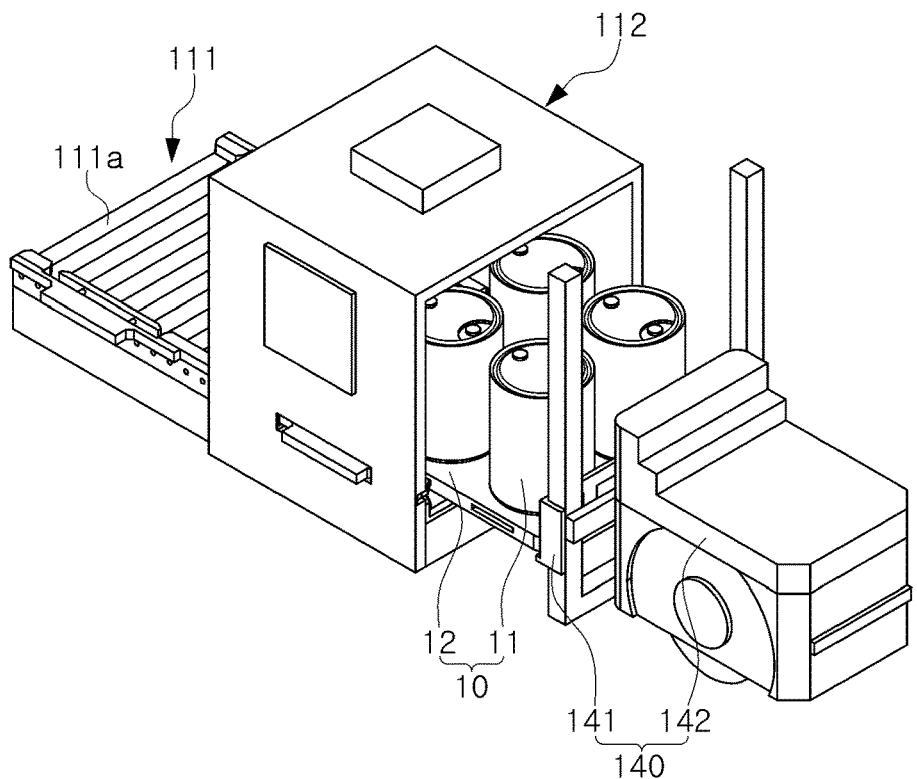
FIGS. 3A and 3B are diagrams exemplarily illustrating a first robot applicable to a chemical supply system according to an example embodiment.
Figure 3B:
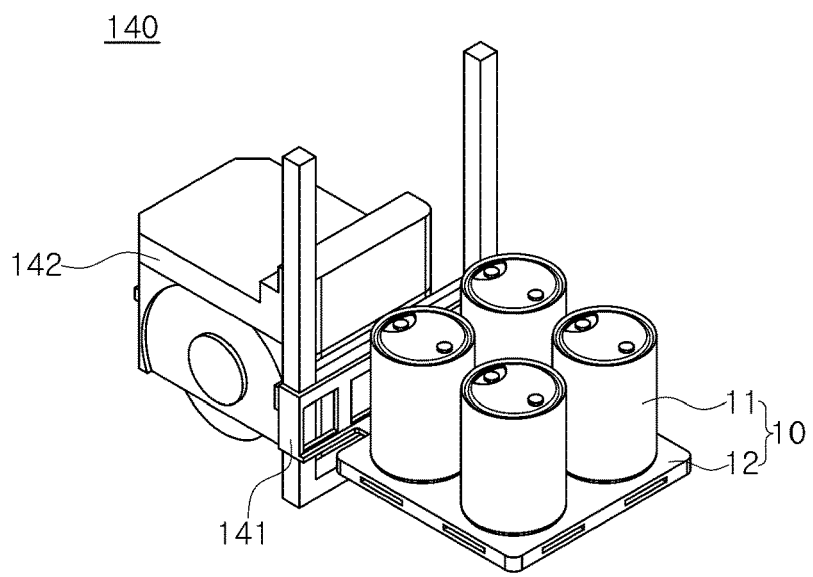

FIGS. 3A and 3B are diagrams exemplarily illustrating a first robot 140 applicable to a chemical supply system of an example embodiment. FIG. 3A illustrates a state in which the first robot 140 carries out a chemical container bundle 10 from the chemical carrying-in device. FIG. 3B illustrates a state in which the chemical container bundle 10 is supported by a forklift 141 of the first robot 140.

Referring to FIGS. 3A and 3B, the first robot 140 according to an example embodiment may be configured to carry out the chemical container 11 carried into the chemical carrying-in device 110 and delivers the same to the temporary storage 120 or the second robot 150. As an example, the first robot 140 may be a mobile robot 142 having a forklift 141. The first robot 140 may raise and lower the chemical container bundle 10 by inserting the forklift 141 into the fork insertion portion of the pallet 12. The forklift may have a two-pronged fork insertion portion, or may have forks with different numbers of prongs (e.g., 1, 3, or other amounts).

The forklift 141 may have a certain level of effective payload (e.g., weight capacity) in order to support the pallet 12 on which a plurality of chemical containers 11 are loaded. For example, the forklift 141 may have an effective payload of about 1200 kg or more.

The mobile robot 142 may move to an operation position according to location information and/or path information input in advance according to a command of the control system. The mobile robot 142 may autonomously check a remaining battery level and move to a charging location to charge the battery.

The first robot 140 may include a third sensor (refer to FIG. 4B) for detecting a position of the pallet 12. The third sensor may be installed on a side of the forklift 141, and may be, for example, a vision sensor, a laser sensor, or a QR reader for detecting a position of the fork insertion portion of the pallet 12, detecting horizontal and vertical alignment state of the pallet 12, and the like, This will be described later with reference to FIGS. 4A and 4B.

The chemical carrying-in device 110 may include a marker for inducing an approach of the first robot 140. For example, the first robot 140 may detect a reflector, a QR code, or the like disposed on the other side of the transfer member 111 to approach the chemical carrying-in device 110, and may insert the forklift 141 into the pallet 12 of the chemical container 11 loaded on the chemical carrying-in device 110. Conversely, the chemical container 11 in which all of the chemicals are exhausted may be carried into the chemical carrying-in device 110 by the first robot 140 and carried out externally.

In addition, the first robot 140 may include an information confirmation sensor (not shown) capable of checking raw material receipt and payment information by scanning a barcode, a QR code, and the like, attached to the chemical container 11 or the pallet 12. The information confirmation sensor may be a laser sensor or a QR reader, installed on a side of the mobile robot 142 to confirm receipt and payment information of the chemical container.

According to an example embodiment, the first robot 140 may directly insert the chemical container 11 into a chemical supply device 130. In this case, the chemical supply device ('130' in FIGS. 6A and 6B) may include a conveyor line (not shown) for a buffer on which the chemical container 11 is seated. The chemical container 11 may be seated on one side of the buffer conveyor line in the chemical supply device ('130' in FIGS. 6A and 6B), and may be moved to an accommodating space of the chemical container by the buffer conveyor line. The first robot 140 may include control software and hardware that automatically controls the first robot 140 in response to control instructions received from a control computer or input by an operator. The software and hardware is configured to control all mechanical and other aspects of the first robot 140, such as movement of wheels to move the first robot 140 to and from different locations, operation of the forklift, for example, to raise and lower the forklift, sensing operations, and other operations.

Figure 4A:
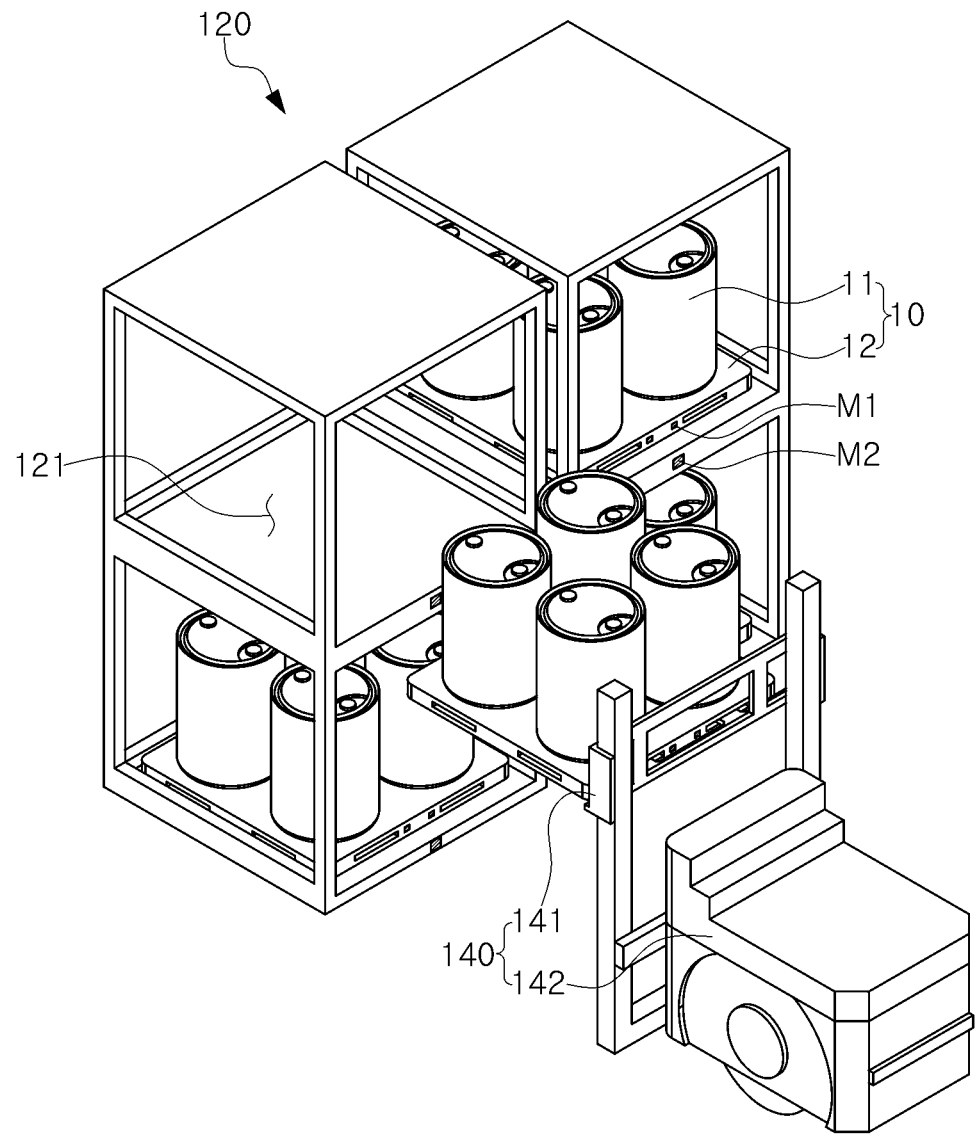
FIGS. 4A and 4B are diagrams exemplarily illustrating a temporary storage applicable to a chemical supply system according to an example embodiment.
Figure 4B:
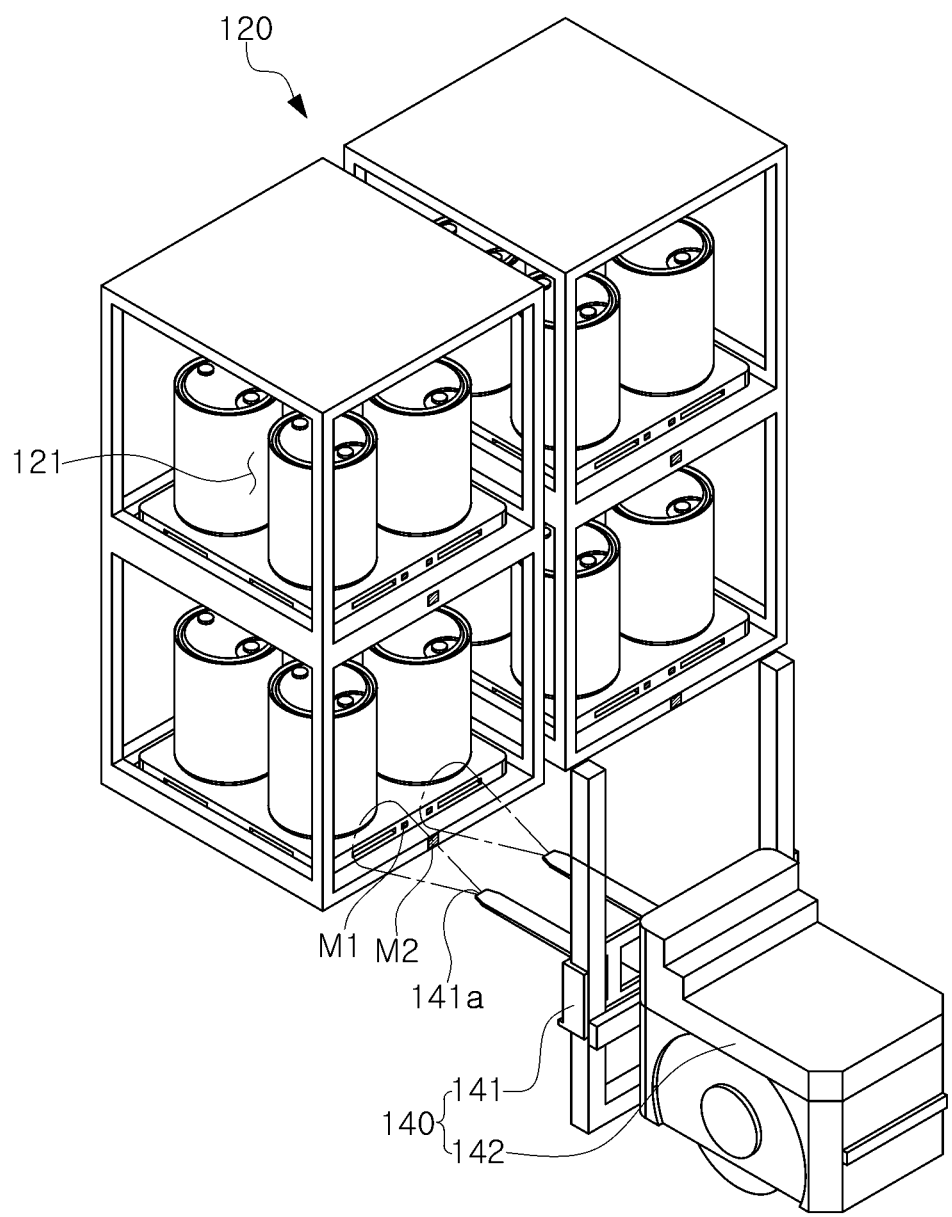

FIGS. 4A and 4B are diagrams exemplarily illustrating a temporary storage 120 applicable to the chemical supply system of an example embodiment. FIGS. 4A and 4B illustrate a state in which the first robot 140 loads the chemical container bundle 10 on the temporary storage 120.

Referring to FIGS. 4A and 4B, the temporary storage 120 according to an example embodiment may have a chemical container storage space 121 in which the chemical container bundle 10 is accommodated. The temporary storage 120 provides a place for temporarily storing the chemical container bundle 10 being carried into the chemical carrying-in device and waiting for replacement, and the chemical container bundle 10 waiting to be carried out after all the chemicals are exhausted from the chemical supply device. The temporary storage 120 may be a two-stage or more pallet rack structure, for example, having a number of shelves and including a number of compartments, one for each container bundle 10. The temporary storage 120 may be made of a corrosion-resistant coating or a corrosion-resistant material such as PTFE.

The temporary storage 120 may include a position marker M2 indicating a position of the chemical container storage space 121. For example, the chemical container bundle 10 has a first position marker M1 indicating a position of the pallet 12 or fork insertion portion, and the temporary storage 120 may include a second position marker M2 indicating a position of the chemical container storage space 121. The first position marker M1 and the second position marker M2 may include a reflector, a QR code, a barcode, and the like. The position markers described herein may also be described as location markers.

The first robot 140 may include a third sensor for recognizing the first position marker M1 and the second position marker M2. The third sensor may be installed at an end 141a of the forklift 141. The third sensor may be a vision sensor, a laser sensor, or a QR reader, for example.

According to an example embodiment, the temporary storage 120 may have an step or bump surrounding the chemical container storage space 121 so that the chemical container bundle 10 is not separated therefrom during a loading process of the chemical container bundle 10. The step may be formed on rear and left and right side surfaces of the chemical container storage space 121 except for a front surface into which the chemical container bundle 10 is put.

According to an example embodiment, the temporary storage 120 may include a fall prevention actuator (not shown) for supporting and fixing the chemical container bundle 10. The fall prevention actuator may press the chemical container 11 or the pallet 12 from a side surface direction, block the front surface of the chemical container storage space 121, or dock the chemical container 11 or the pallet 12 to fix the chemical container bundle 10 within a temporary storage 120 compartment.

According to an example embodiment, the temporary storage 120 may include a load detection sensor for detecting whether the chemical container bundle 10 is transferred or loaded in the chemical container storage space 121. The load detection sensor may transmit transfer and load information of the chemical container bundle 10 to the control system. For example, when the transfer and load information registered in the control system and the transfer information transmitted by the load detection sensor are different, it is possible to correct an error in the transfer and load information of the control system or to check whether the chemical container bundle 10 is deviated therefrom. In addition, the load detection sensor may be directly linked with the first robot 140 to prevent the first robot 140 from overloading the chemical container bundle 10 in the chemical container storage space 121.

According to an example embodiment, the temporary storage 120 may include a leakage detection sensor. The leakage detection sensor may detect whether a chemical leakage has occurred in the chemical container 11 stored in the temporary storage 120.

Figure 5A:
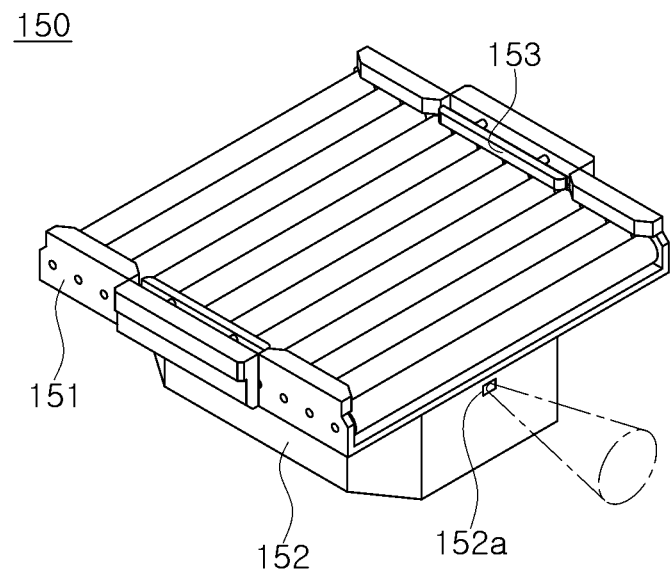
FIGS. 5A and 5B are diagrams exemplarily illustrating a second robot applicable to a chemical supply system according to an example embodiment.
Figure 5B:
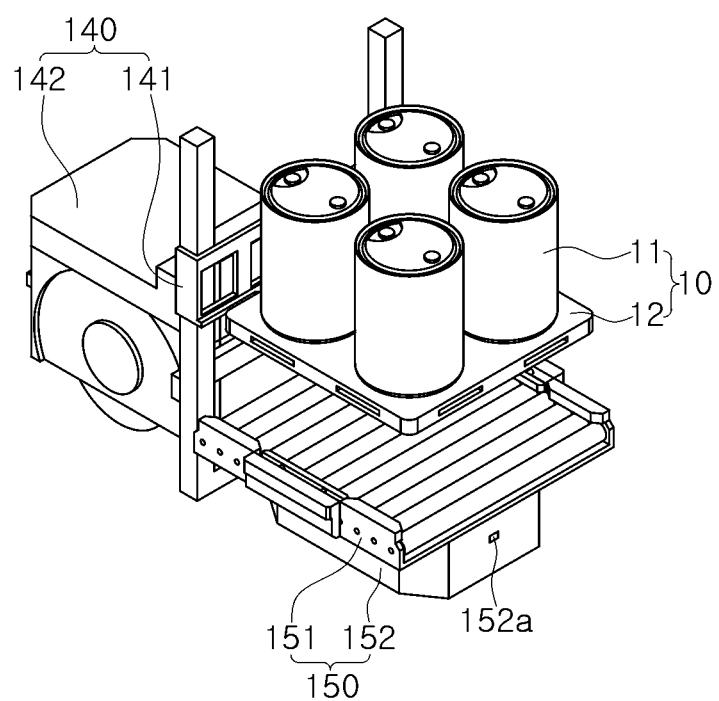

FIGS. 5A and 5B are diagrams exemplarily illustrating a second robot 150 applicable to a chemical supply system according to an example embodiment.

Figure 6A:
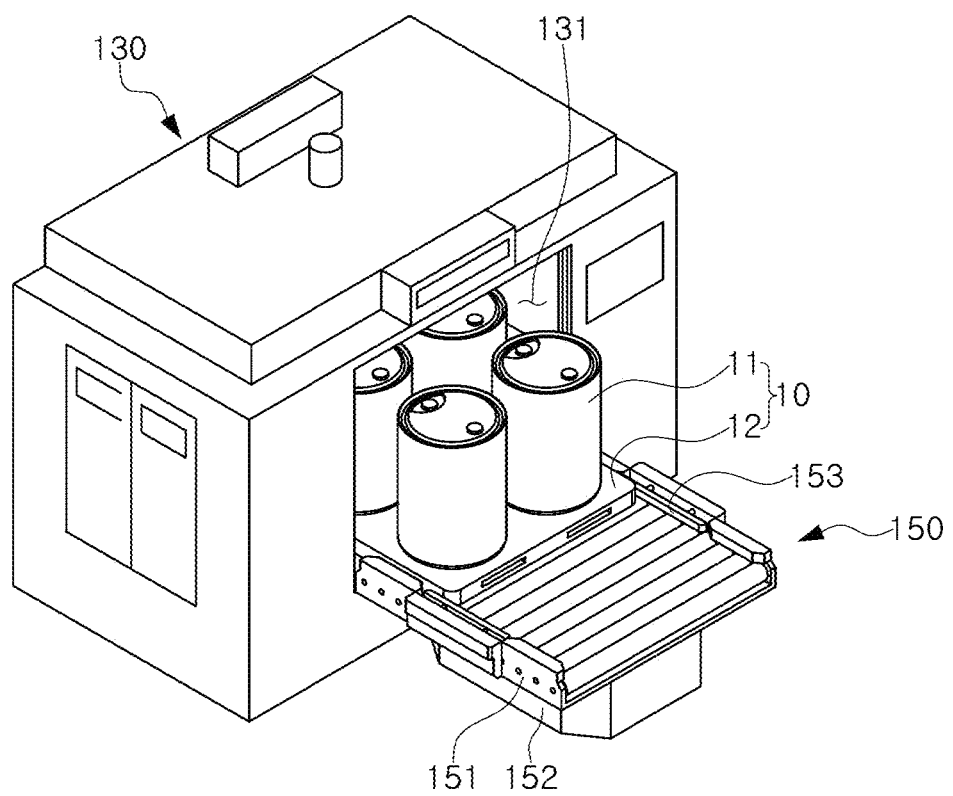
FIGS. 6A and 6B are diagrams exemplarily illustrating a chemical supply device applicable to a chemical supply system according to an example embodiment.

Referring to FIGS. 5A and 5B, a second robot 150 of an example embodiment may be configured to put the chemical container 11 received from the first robot 140 into the chemical supply device ('130' in FIG. 6A). For example, the second robot 150 may be a mobile robot 152 having a conveyor 151 capable of transferring the chemical container 11 in one direction.

The conveyor 151 may be configured as a roller or a belt. For example, the conveyor 151 may transport the chemical container 11 in one direction or in a direction opposite to the one direction by rotating a plurality of rollers disposed in one direction.

Depending on example embodiments, a load detection sensor for detecting whether the chemical container 11 or the pallet 12 is seated on the conveyor 151 may be disposed. For example, in order to determine whether the chemical container 11 is seated and the position of the conveyor 151, a load detection sensor may be installed at regular intervals on a side of the conveyor 151 or the fall prevention guide. In addition, the conveyor 151 may be made of a corrosion-resistant coating or a corrosion-resistant material such as PTFE, and according to example embodiments, a leak detection sensor may be installed on the conveyor 151 to detect any chemical leakage of the chemical container 11.

The second robot 150 may further include an alignment member 153 configured to align the chemical container bundle 10 on the conveyor 151. The alignment member 153 may be disposed on both sides of the conveyor 151 and in a direction of movement of the pallet 12, and may align the chemical container 11 or the pallet 12 to a central portion of the conveyor 151. For example, the alignment member 153 may align the chemical container 11 to the central portion of the conveyor 151 before the conveyor 151 operates. The alignment member 153 may have a similar structure to the alignment member 113 discussed above in connection with transfer member 111. In addition, guides for preventing separation of the chemical container 11 or the chemical container bundle 10 may be installed on both sides of the conveyor 151 for use while the conveyor 151 is operating.

The mobile robot 152 may move to an operating position according to position information and/or path information input in advance according to a command of a control system. The mobile robot 152 may autonomously determine a remaining battery level and move to a charging location to charge the battery.

The second robot 150 may include a fourth sensor 152a for recognizing a chemical container accommodating space of the chemical supply device ('130' in FIG. 6A). The fourth sensor may be installed on a side of the mobile robot 152 to detect a symbol, reflector or code such as a QR code attached to an outside or inside of the chemical supply device ('130' in FIG. 6A). The fourth sensor 152a may be a vision sensor, a laser sensor, or a QR reader, for example. When the first robot 140 puts the chemical container into the chemical supply device ('130' in FIG. 6A) using a forklift 141, it may be necessary to install a conveyor line for a buffer inside the chemical supply device ('130' in FIG. 6A) to prevent damage to internal devices and chemical containers. However, since the second robot 150 directly puts the chemical container 11 in the chemical supply device using the conveyor 151, a conveyor line for the buffer is not needed, and it is possible to reduce manufacturing costs of the chemical supplying device ('130' in FIG. 6A) and to dispose a larger number of chemical supply devices ('130' in FIG. 6A).

Figure 6B:
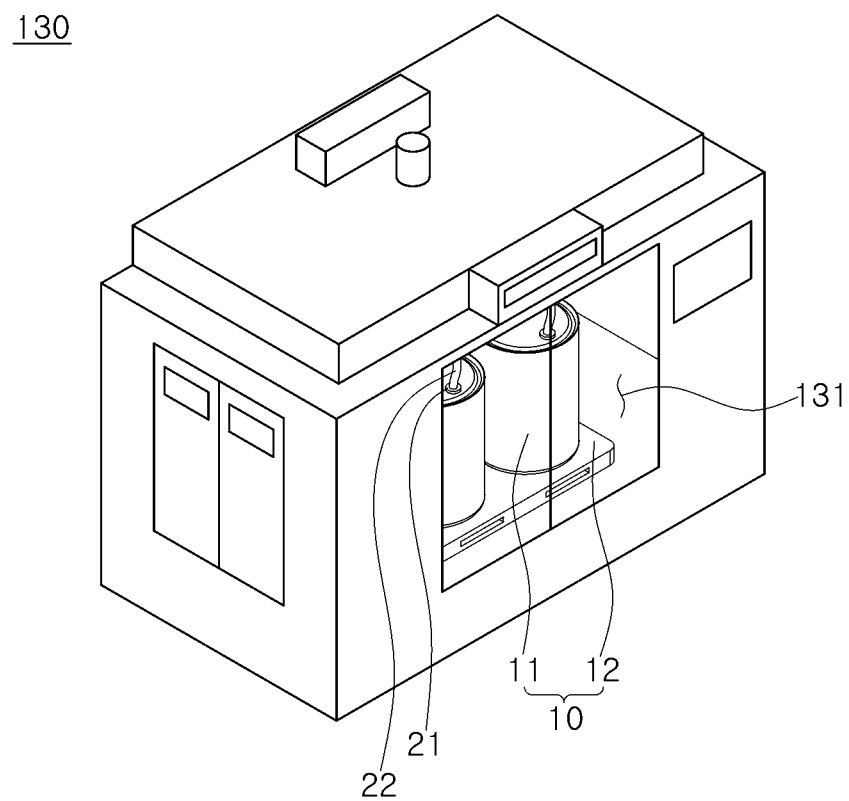

FIGS. 6A and 6B are diagrams exemplarily illustrating a chemical supply device 130 applicable to a chemical supply system according to an example embodiment.

Referring to FIGS. 6A and 6B, the chemical supply device 130 of an example embodiment may connect a chemical supply pipe 22 to an outlet of the chemical container 11 accommodated in the chemical container accommodating space 131, to supply chemicals in the chemical container 11 to various semiconductor processing operations. A loader unit, an alignment unit, and the like, capable of supporting the chemical container 11 and adjusting a position thereof may be disposed in the chemical container accommodating space 131. As illustrated in the figure, a pallet 12 and chemical containers 11 may be carried into the chemical supply device 130 together, but depending on example embodiments, only the chemical containers 11 without the pallet 12 may be carried thereinto.

Figure 7A:
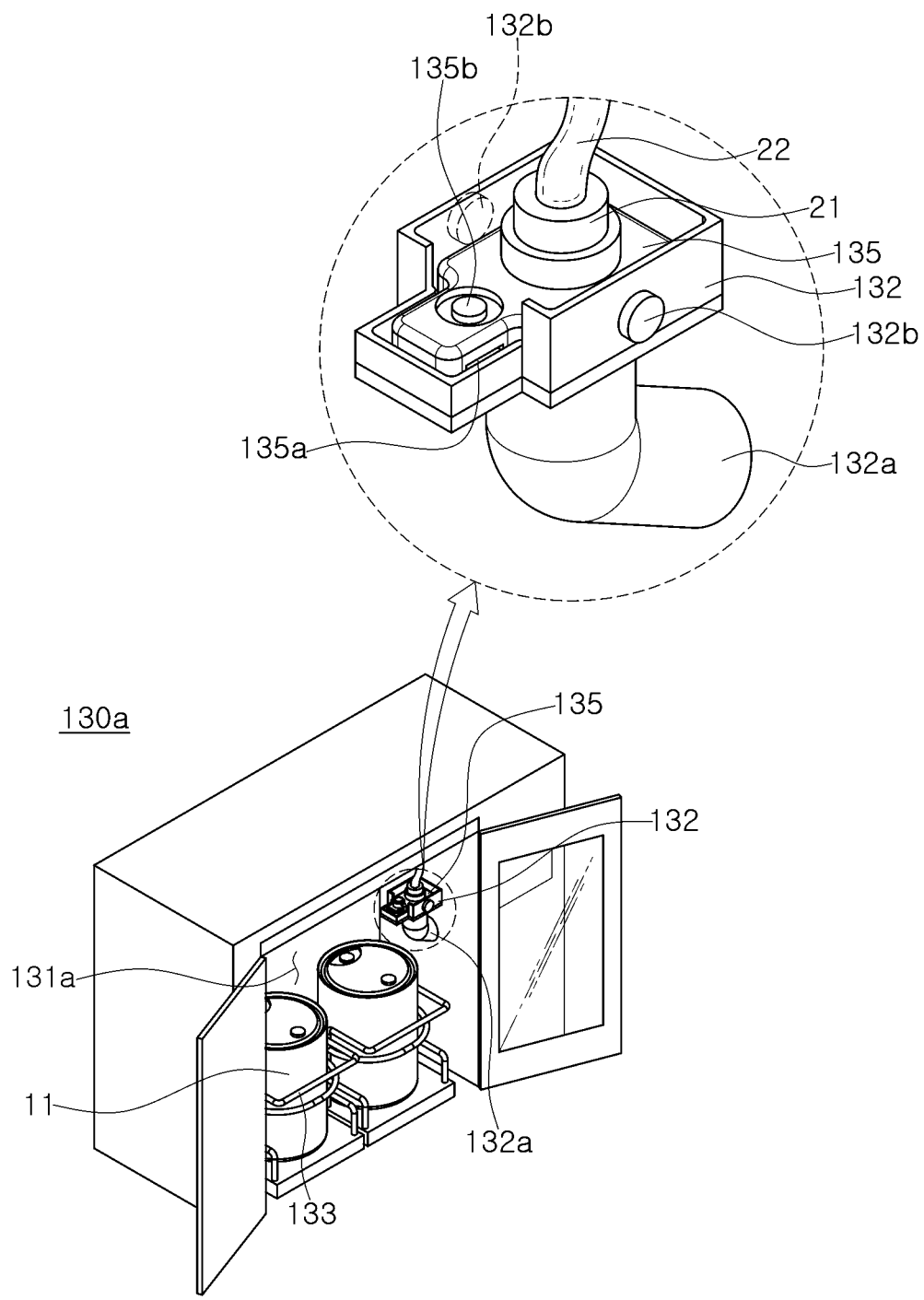
FIGS. 7A to 7D are diagrams exemplarily illustrating a third robot applicable to a chemical supply system according to an example embodiment.
Figure 7B:
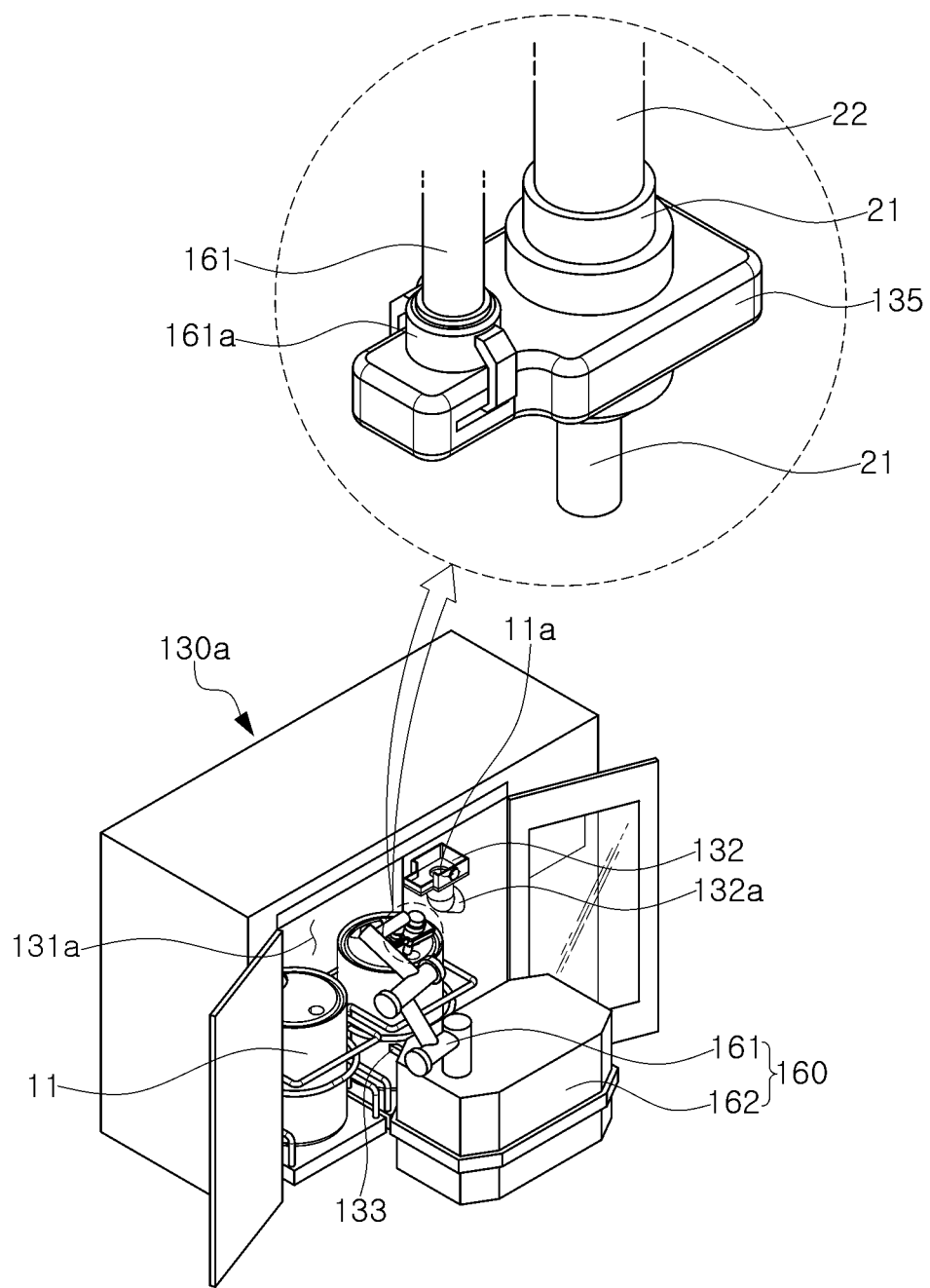

The chemical supply device 130 may include a coupler connection module (not illustrated) for automatically fastening and separating the coupler 21 to an outlet of the chemical container 11. One end of the coupler 21 may be connected to the chemical supply pipe 22 for distributing the chemical. The coupler connection module may include an opening/closing unit for opening and closing a cap of the chemical container, a coupler unit for fastening and separating the coupler 21 to the outlet of the chemical container, a control unit for controlling an operation thereof, and the like. Depending on example embodiments, the coupler 21 may be automatically coupled to and separated from the chemical container 11 by a mobile robot having a robot arm (refer to an example embodiment of FIG. 7A).

In addition, a chemical container 11 in which all chemicals are exhausted may be replaced with a new chemical container 11 by a second robot 150. The second robot 150 may perform an operation according to a transfer command, a replacement command, and the like of the chemical container transmitted from a control system. The second robot 150 may access the chemical supply device 130 designated by the control system, and perform a transfer operation of the chemical container bundle 10. The second robot 150 may perform a transfer operation of the chemical container bundle 10 according to position information and/or path information input in advance. A reflector or QR code including the position information thereof may be attached to an outside or an inside of the chemical supply device 130. The second robot 150 may identify the chemical supply device 130 by using a vision sensor, a laser sensor, or a QR reader, and perform carrying-in and carrying-out operations of the chemical container 11 from the chemical supply device 130 designated by the control system. According to example embodiment, the chemical supply device may include a communication unit transmitting carrying-in and carrying-out information of the chemical container to the second robot 150. The accommodating space 131 may include a shelf of platform, generally described as a floor or bottom surface, on which the pallet 12 is placed by the second robot 150.

FIGS. 7A to 7D are diagrams exemplarily illustrating a third robot 160 applicable to a chemical supply system according to an example embodiment.

Referring to FIGS. 7A to 7D, a chemical supply device 130a of an example embodiment may include a coupler module 135 and a cradle 132, and the chemical container 11 carried into the chemical accommodating space 131a may be coupled to and separated from the coupler module 135 by the third robot 160. The chemical containers 11 individually carried in the chemical supply device 130a may be fixed to a support member 133 disposed on one side of the third robot 160. The support member 133 may support and fix the chemical container 11 in a process of coupling and separating the coupler module 135. However, depending on an example embodiment, the pallet 12 and the chemical containers 11 may be carried thereinto together, and so either no support member 133 is included, or the support member 133 may be pre-installed on a pallet 12. Alternatively, a fourth robot may be used to individually separate the chemical containers 11 from the pallet 12 and place them in the chemical accommodating space 131a of FIGS. 7A-7D, or the third robot 160 and a coupler module 135 and cradle 132 such as depicted in FIGS. 7A-7D may be used in a chemical supply device such as chemical supply device 130 of FIGS. 6A-6B. The third robot 160 may perform an operation according to a replacement command of the chemical container transmitted from a control system. The third robot 160 may access the chemical supply device 130a designated by the control system to perform a replacement operation of the chemical container 11. The control system may optimize a movement path and operating performance of the third robots 160, by using the position information and operating information of the plurality of third robots 160.

The chemical supply device 130a and the third robot 160 of the present example embodiment do not necessarily constitute a chemical supply system together with the equipment shown in FIGS. 2A to 6B. For example, the chemical supply system of an example embodiment may include a chemical supply device 130a having a chemical container accommodating space 131a in which a chemical container 11 in which chemical information is confirmed is accommodated, and configured to supply the chemical in the chemical container 11 to a place of use thereof; and a mobile robot 162 configured to fasten and separate the coupler module 135 to an outlet of the chemical container 11 carried in the chemical accommodating space 131a.

The cradle 132 may be disposed on one side of the chemical container accommodating space 131a. The cradle 132 may store the coupler module 135 that is not fastened to the chemical container 11. The cradle 132 may be connected to a chemical drain 132a for removing chemicals remaining in the coupler module 135. In addition, a cap holder 132b capable of temporarily holding the cap 11a of the chemical container 11 to which the coupler module 135 is fastened may be installed on one side of the cradle 132.

Figure 7C:
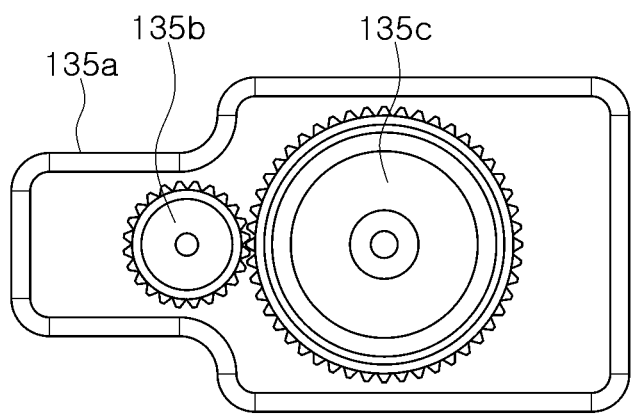
Figure 7D:
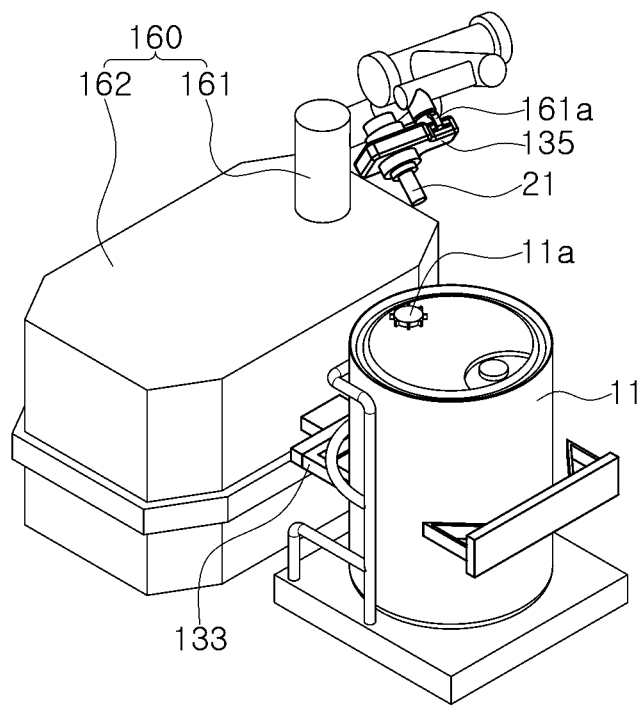

The coupler module 135, also described as a coupling interface, may include a main housing, a grip portion 135a, also described as a gripper receiving slot, gripped by the gripper 161a, also described as a gripping claw, a driving force transmission unit 135b, also described as a driving transmission, provided with driving force from the robot arm 161, and a coupler driving unit 135c receiving driving force from the driving force transmission unit 135b to fasten and separate the coupler 21 (see FIG. 7C). For example, the driving force transmission unit 135b may be a gear unit docked with the gripper 161a or a power transmission link inside the gripper 161a, to transmit rotational force. The coupler module 135 may also include a coupler connection portion where a coupler 21 connects to the coupler module 135.

One end of the coupler 21 may be connected to the chemical supply pipe 22 for distributing chemicals. A key-code may be formed in a fastening portion of the coupler 21. The coupler 21 may be fastened to an outlet of the chemical container 11 in which the key-code corresponding thereto is formed. The coupler 21 may be, for example, a coupling nozzle and/or ring or a coupling terminal having a circular or other shape that fits at one end around the chemical supply pipe 22 and outputs the chemical at the other end.

For example, the coupler 21 may have an embossed key-code, and the chemical container 11 may have an engraved key-code. Since the key-code of the chemical container 11 is formed differently depending on the type of chemical, the coupler 21 and the chemical container 11 of which key code does not correspond to each other may not be fastened to each other.

The third robot 160 may be a mobile robot 162 having a robot arm 161 configured to grip the coupler module 135. The third robot 160 may be made of a corrosion-resistant coating or a corrosion-resistant material such as PTFE. According to an embodiment, an air spraying module may be installed to prevent the third robot 160 from being exposed to chemicals.

The robot arm 161 may have a gripper 161a for gripping the coupler module 135 at one end, and may be configured to provide driving force for fastening and separating the coupler module 135. The robot arm 161 may have an articulated arm shape to perform a coupling operation of the coupler module 135 in the chemical container accommodating space 131. A vision sensor, and the like may be installed together with the gripper 161a at one end of the articulated arm.

The mobile robot 162 may move to an operating position according to position information and/or path information input in advance according to a command of the control system. The mobile robot 162 may sense a reflector or QR code attached to the chemical supply device 130a to access the chemical supply device 130a used for an operation. The mobile robot 162 may autonomously check the remaining battery level and move to a charging location to charge the battery. A labyrinth seal structure blocking chemical penetration may be applied to a charging terminal of a charging station.

The third robot 160 may be configured to perform operations such as monitor operation, door opening and closing, cap opening and closing, coupler module coupling, chemical leakage cleaning, and the like.

For example, when the third robot 160 approaches a chemical supply device 130a requiring an operation, the robot arm 161 may sense a monitor of the chemical supply device 130a using a vision sensor, operate the monitor with the gripper 161a, and change the same to an operating mode of the chemical supply device 130a.

As another example, when the third robot 160 is switched to a replacement mode of the chemical container 11, in which a replacement chemical container 11 is transferred into a chemical supply device 130a, the third robot 160 may open a door of the chemical supply device 130a using the gripper 161a. However, a replacement operation of the chemical container 11 using the third robot 160 does not need to use a vision sensor. According to an example embodiment, the replacement operation of the chemical container 11 may be performed by recognizing a QR code attached to the cradle 132, the coupler module 135, the door of the chemical supply device 130a, the chemical container 11, and the like.

As another example, the robot arm 161 may sense a cap 11a and a drum outlet of the chemical container 11 with a vision sensor, to check position information of the cap 11a. The robot arm 161 may open and close the cap by using the position information of the cap 11a.

For example, the robot arm 161 may be configured to rotate the gripper 161a or a power transmission link inside the gripper 161a. The robot arm 161 may grip the cap 11a using the gripper 161a, and transmit a rotational force to the cap 11a to separate the cap 11a from the chemical container 11.

In one embodiment, a compliance joint may be installed on one side of the gripper 161a so that the cap 11a can be fastened and separated even when an upper surface of the chemical container 11 is slightly inclined (for example, about ±5°) with respect to a horizontal plane.

The robot arm 161 may sense a cradle 132 with a vision sensor, and mount the cap 11a on a cap holder 132b.

In one embodiment, the robot arm 161 may grip the coupler module 135 stored in the cradle 132, remove it from the cradle 132, and fasten the coupler module 135 to an outlet of the chemical container 11 from which the cap 11a is carried out. The robot arm 161 may fasten the coupler module 135 by using position information of the outlet of the chemical container 11 confirmed by the vision sensor. The robot arm 161 may confirm a key code of each of the coupler 21 and the chemical container 11 with a vision sensor, align the key code, or confirm whether the key codes correspond to each other.

In one embodiment, the robot arm 161 may detect a chemical leakage generated during replacement of the chemical container 11 and wipe it. The robot arm 161 may grip or dock a cleaning material provided in the chemical supply device 130a to wipe the chemical leakage. The robot arm 161 may perform the above-described operations in a reverse order to separate the coupler module 135 from the chemical container 11 in which all the chemicals are exhausted, and fasten the cap 11a. During an entire process, it is possible to determine whether the coupler module 135 and the cap 11a are properly fastened, or fastened with an appropriate torque using a laser sensor, a torque sensor, and the like included in the robot arm 161.

The robot arm 161 may perform an operation such as shaking or turning over the separated coupler module 135 in order to minimize chemical leakage. In addition, the robot arm 161 may store the separated coupler module 135 in the cradle 132.

Figure 8:
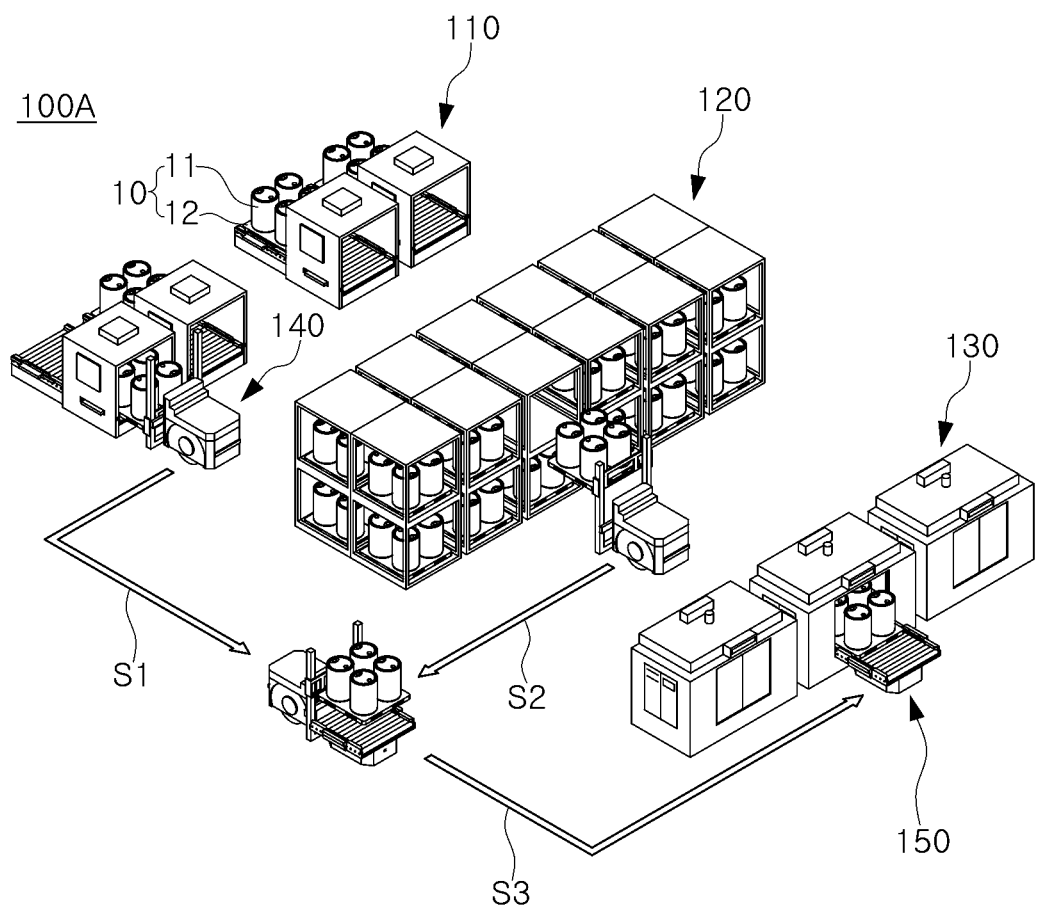
FIG. 8 is a diagram exemplarily illustrating a chemical supply system comprising the exemplary devices shown in FIGS. 2A to 6B.

FIG. 8 is a diagram illustrating a chemical supply system 100A comprised of the exemplary devices shown in FIGS. 2A to 6B.

Referring to FIG. 8, a chemical supply system 100A may perform a replacement operation of a chemical container using a first robot 140 of FIGS. 3A and 3B and a second robot 150 of FIGS. 5A and 5B. The first robot 140 and the second robot 150 may perform an operation in each operation according to an operation command transmitted from a control system, thereby preventing safety accidents and improving efficiency of a transfer operation and a replacement operation of the chemical container. The control system can include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output to the processing controller 1020 (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. In addition, control system can include antennas, network interfaces that provide wireless and/or wire line digital and/or analog interface between components and to one or more networks over one or more network connections (not shown), a power source that provides an appropriate alternating current (AC) or direct current (DC) to power one or more components, and a bus that allows communication among the various disclosed components.

In a first operation (S1), a chemical container bundle 10 may be carried into a chemical carrying-in device 110. The chemical carrying-in device 110, also described as a chemical loading device, may inspect chemical information of the chemical containers 11, and transmit the same to the control system. For example, when the chemical information is inappropriate, the chemical carrying-in device 110 may be operated to carry out the chemical container bundle 10 externally. The chemical container bundle 10 for which the chemical information is confirmed may be carried out from the chemical carrying-in device 110 by the first robot 140. The first robot 140 may transfer the chemical container bundle 10 from the chemical carrying-in device 110 to a temporary storage 120 or transfer the same to the second robot 150.

In a second operation (S2), the temporary storage 120 may store chemical container bundles 10 carried into the chemical carrying-in device 110 and waiting to replace existing chemical container bundles 10 when they are empty, as well as chemical container bundles 10 that have been emptied of all the chemicals and waiting to be carried out. The first robot 140 may deliver a replacement chemical container bundle 10 from among the chemical container bundles 10 stored in the temporary storage 120 to the second robot 150. Alternatively, the first robot 140 may return a chemical container bundle 10 in which the chemical is exhausted (e.g., emptied) to the chemical carrying-in device 110, and the chemical container bundle 10 returned by the first robot 140 may be carried out externally by the chemical carrying-in device 110.

In a third operation (S3), the second robot 150 may be configured to carry in a chemical container bundle 10 received from the first robot 140 into the chemical supply device 130. The second robot 150 may transfer the chemical container bundle 10 or a chemical container received from the first robot 140 to the chemical supply device 150. The chemical supply device 130 may connect a chemical supply pipe to an outlet of the chemical container 11 carried thereinto, to supply the chemicals in the chemical container 11 to various semiconductor process operations.

The mobile robots described herein include wheels or other transportation means for moving freely about a facility and include a control system configured to provide autonomous movement based on received commands or instructions.

As set forth above, according to example embodiments of the present inventive concept, by automating carrying-in and carrying-out operations of a chemical container, a chemical supply system having improved operational efficiency as well as improved safety may be provided.

While example embodiments have been shown and described above, it will be apparent to those skilled in the art that modifications and variations could be made without departing from the scope of the present invention as defined by the appended claims.

What is claimed is:

1. A chemical supply system, comprising:
a chemical container receiving station configured to receive a chemical container, inspect chemical information of the chemical container and confirm the chemical information;
a temporary storage configured to store the chemical container;
a chemical supply device configured to supply a chemical in the chemical container to a place of use of the chemical;
a first mobile robot configured to receive the chemical container for which the chemical information is confirmed from the chemical container receiving station and to transport the chemical container freely and autonomously along a floor of a facility, the first mobile robot including a lift configured to raise and lower a pallet upon which the chemical container is loaded; and
a second mobile robot configured to carry the chemical container transported by the first mobile robot into the chemical supply device, the second mobile robot including a conveyor configured to receive the pallet from the lift of the first mobile robot.

2. The chemical supply system of claim 1, wherein the chemical container receiving station comprises:
a transfer member having a first side on which the chemical container is seated when received and a second side to which the chemical container is transferred in order to inspect the chemical information; and
an inspection area for inspecting the chemical information on the second side.

3. The chemical supply system of claim 2, wherein,
when the pallet on which the chemical container is loaded is on the first side of the transfer member, the transfer member is operated so that the pallet is transferred to the second side, and
when the pallet is seated on the second side of the transfer member, the transfer member is stopped.

4. The chemical supply system of claim 3, wherein the chemical container receiving station comprises a first sensor for detecting whether the pallet is seated on the first side of the transfer member.

5. The chemical supply system of claim 4, wherein the chemical container receiving station comprises a second sensor for detecting whether the pallet protrudes from the second side of the transfer member.

6. The chemical supply system of claim 2, wherein the chemical container receiving station further comprises an alignment member configured to align the pallet on which the chemical container is loaded on the transfer member.

7. The chemical supply system of claim 1, wherein the first mobile robot is configured to deliver the chemical container to the temporary storage in addition to being configured to deliver the chemical container to the second mobile robot.

8. The chemical supply system of claim 1, wherein the first mobile robot has a forklift.

9. The chemical supply system of claim 8, wherein:
the pallet has a fork insertion portion, and
the first mobile robot is configured to insert the forklift into the fork insertion portion to raise and lower the pallet.

10. The chemical supply system of claim 8, wherein the first mobile robot comprises a sensor for recognizing a storage space of the temporary storage, the storage space for storing the chemical container.

11. The chemical supply system of claim 1, wherein the second mobile robot is configured to put the chemical container received from the first mobile robot into the chemical supply device.

12. The chemical supply system of claim 1, wherein the second mobile robot comprises a sensor for recognizing an accommodating space of the chemical supply device for the chemical container.

13. The chemical supply system of claim 1, wherein:
the chemical supply device comprises a coupler connection module for fastening a coupler to an outlet of the chemical container, and
the coupler is connected to a chemical supply pipe for distributing the chemical in the chemical container.

14. The chemical supply system of claim 1, further comprising:
a third mobile robot configured to fasten and separate a coupler module to an outlet of the chemical container transported into the chemical supply device.

15. The chemical supply system of claim 14, wherein the third mobile robot has a robot arm configured to grip the coupler module.

16. The chemical supply system of claim 14, wherein:
the third mobile robot is configured to provide driving force for fastening and separating the coupler module to the outlet, and
the coupler module comprises a coupler connected to a chemical supply pipe for distributing the chemical in the chemical container, and a driving force transmission unit configured to transmit the driving force to the coupler.

17. A chemical supply system, comprising:
a chemical supply device having a chemical container accommodating space in which a chemical container is accommodated, and configured to supply a chemical in the chemical container to a place of use of the chemical; and
a mobile robot configured to fasten and separate a coupling interface to an outlet of the chemical container carried into the chemical accommodating space, the mobile robot being configured to autonomously and freely move about a floor of a facility,
wherein:
the mobile robot has a robot arm configured to grip the coupling interface, and
the coupling interface comprises a coupling terminal connected to a chemical supply pipe, and a driving force transmission unit configured to transmit driving force provided from the robot arm to the coupling terminal.

18. A chemical supply system, comprising:
a chemical container receiving station configured to inspect chemical information of a chemical container and confirm the chemical information;
a temporary storage configured to store the chemical container;
a chemical supply device configured to supply a chemical in the chemical container to a place of use of the chemical;
first and second mobile robots configured to transfer the chemical container for which the chemical information is confirmed to the temporary storage or the chemical supply device,
wherein the first mobile robot is configured to transfer the chemical container from the chemical container receiving station to the temporary storage and to transfer the chemical container to the second mobile robot, and
wherein the second mobile robot is configured to receive the chemical container from the first mobile robot and transfer the chemical container received from the first mobile robot to the chemical supply device.

* * * * *